Figure 1:
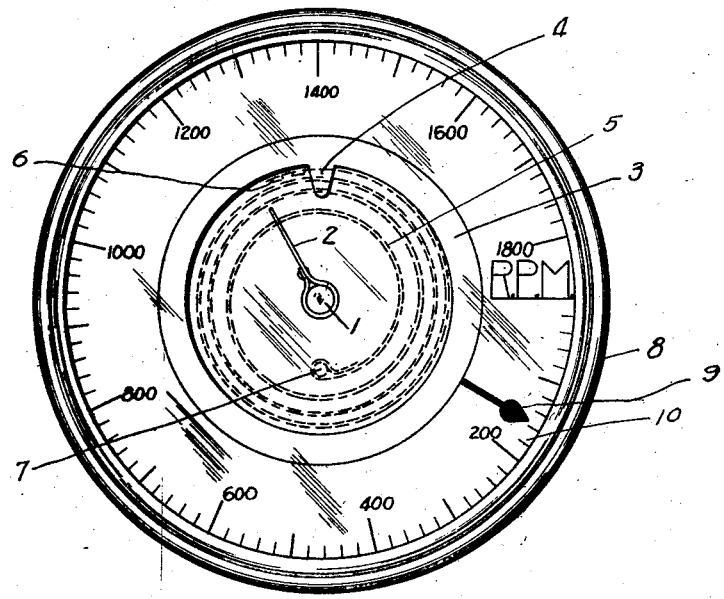
Figure 2:
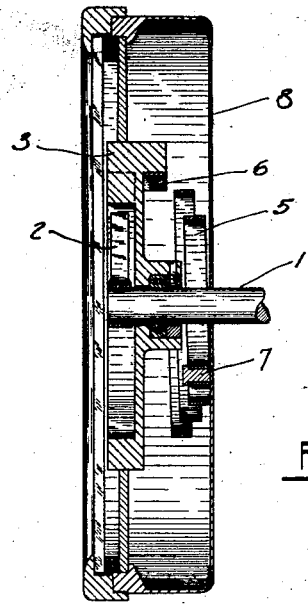

Nov. 17, 1925.

G. P. LUCKEY 1,562,351

TACHOMETER

Filed Oct. 26, 1922

INVENTOR.
George P. Luckey
BY
Robert H. Young ATTORNEYS.

Patented Nov. 17, 1925.

1,562,351

UNITED STATES PATENT OFFICE.

GEORGE P. LUCKEY, OF DAYTON, OHIO.

TACHOMETER.

Application filed October 26, 1922. Serial No. 597,101.

*To all whom it may concern:*

Be it known that I, GEORGE P. LUCKEY, a citizen of the United States, residing at Dayton, in the county of Montgomery and State of Ohio, have invented certain new and useful Improvements in Tachometers, of which the following is a specification.

This invention relates to tachometers and the main object in view is to produce an instrument of the character referred to, involving simplicity and reliability to a high degree, the mechanism comprising a minimum number of elements and being entirely mechanical in structure and operation.

With the above and other objects in view, the invention consists in the novel construction, combination and arrangement herein fully described, shown and claimed.

In the accompanying drawings:

Fig. I is a front elevation, partly broken away, of the improved tachometer.

Fig. II is a diametrical section through the same.

As illustrated, 1 represents a rotary element, such as a shaft, the speed of rotation of which is to be measured. Fastened to the shaft 1 and extending radially therefrom is a tappet 2 which may consist of a leaf spring or spring arm with or without a weight thereon.

Encircling the shaft 1 is a ring like member 3, concentric with the shaft 1. A projection or shoulder 4 on the inside of the ring 3 lies in the path of the extremity of the tappet 2 and is struck by the tappet in each revolution of shaft 1. The ring 3 is constrained by a coiled spring 5 having one end fastened to said ring at 6 and the other end fastened to a fixed stud 7 on the casing 8 of the instrument.

The ring 3 has an outwardly projecting indicator arm or pointer 9 which sweeps over a graduated scale 10 on the casing 8 and registers the amplitude of movement of the ring 3.

In operation, as the shaft rotates, the tappet is carried around at the same speed as the shaft and strikes the projection 4 once in each revolution of the shaft propelling the ring and the pointer 9 from the zero point a distance proportionate to the speed of the shaft. The spring 5 tends to return the ring and pointer to zero. Thus the tappet and spring act in opposite directions on the ring and therefore the pointer is held at a point beyond zero, according to the speed of the shaft. The faster the shaft rotates, the more frequent are the blows of the tappet and the further the advance of the pointer over the scale. The torque increases as the impacts per unit of time increase and is balanced by the spring 5, so that for each rate of rotation of the shaft, there will be a given position of the ring and the revolutions per minute may be read from the pointer in conjunction with the scale.

In order that the tachometer may register very low speeds, I may provide the ring 3 with a plurality of tappets 4 or I may provide a series of springs 2 or a plurality of each as will be obvious.

I claim—

1. A tachometer embodying a rotary yieldable tappet, a rotatably mounted resiliently constrained ring having a projection lying in the path of said tappet and adapted to be struck thereby, indicating means fixedly secured to and movable with said ring and calibrated means positioned to indicate the amplitude of rotative displacement of said indicating means.

2. A tachometer embodying in combination, a tappet movable in a circular path and driven by the element, the speed of rotation of which is to be measured, a rotatably mounted resiliently constrained ring having a projection lying in the path of sweep of said tappet and adapted to be struck thereby to actuate said resiliently constrained ring, indicating means fixedly secured to and movable with said ring and calibrated means positioned to indicate the amplitude of displacement of the last named member.

3. A tachometer embodying in combination, a yieldable tappet movable in a circular path and driven by the element the speed of rotation of which is to be measured, a rotatably mounted resiliently constrained ring having a projection lying in the path of sweep of said tappet and adapted to be struck thereby to actuate said resiliently constrained ring, indicating means fixedly secured to said ring and movable therewith, and calibrated means fixed to said casing and positioned to indicate the amplitude of displacement of said indicating means.

In testimony whereof I affix my signature.

GEORGE P. LUCKEY.